No. 820,204.  PATENTED MAY 8, 1906.
J. C. JORGENSEN.
CAR FENDER.
APPLICATION FILED AUG. 16, 1905.
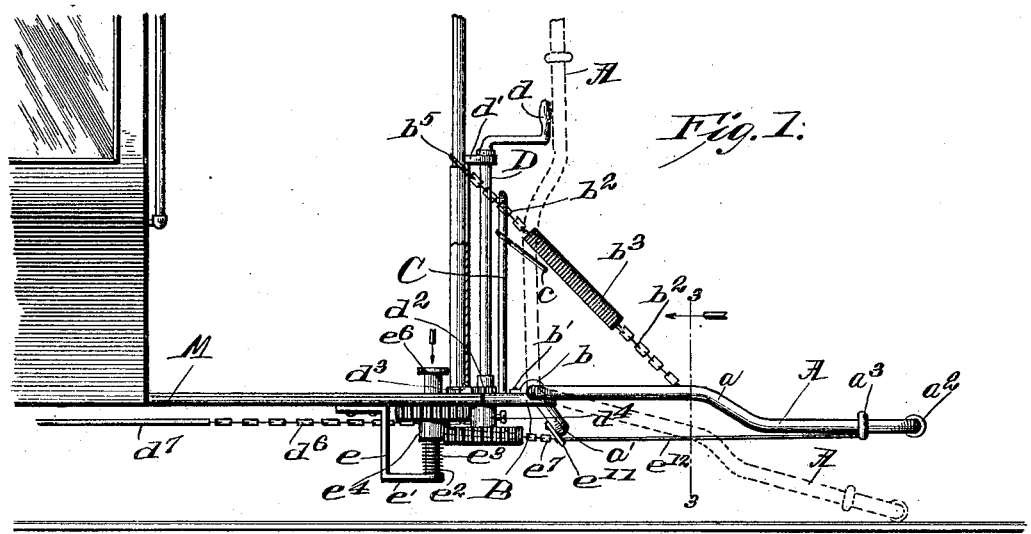
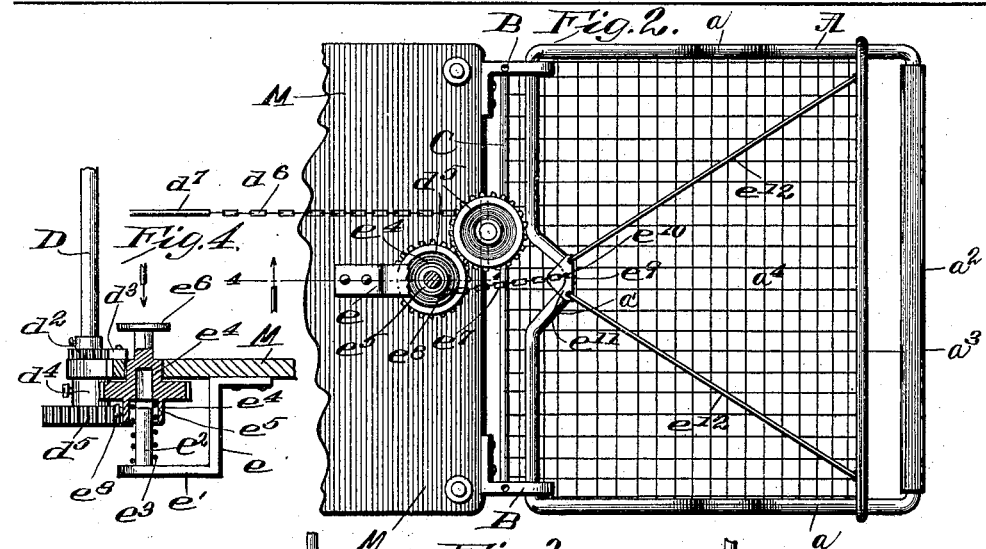
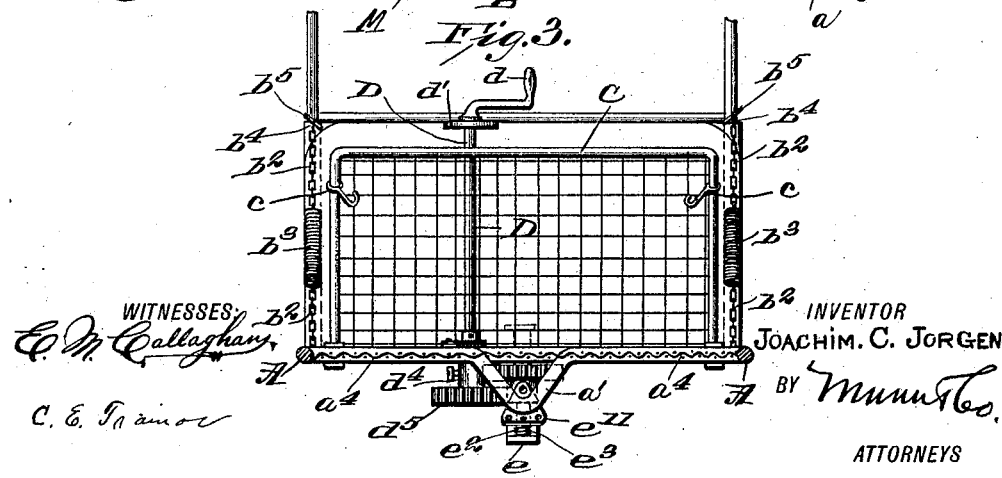
WITNESSES:
E. M. Callaghan
C. E. Trainor
INVENTOR
JOACHIM. C. JORGENSEN
BY Munn & Co.
ATTORNEYS

UNITED STATES PATENT OFFICE.

JOACHIM C. JORGENSEN, OF WASHINGTON, DISTRICT OF COLUMBIA, ASSIGNOR OF ONE-HALF TO JACOB C. DONALDSON, OF WASHINGTON, DISTRICT OF COLUMBIA.

CAR-FENDER.

No. 820,204.   Specification of Letters Patent.   Patented May 8, 1906.

Application filed August 16, 1905. Serial No. 274,406.

*To all whom it may concern:*

Be it known that I, JOACHIM C. JORGENSEN, a citizen of the United States, and a resident of Washington, District of Columbia, have invented certain new and useful Improvements in Car-Fenders, of which the following is a specification.

My invention is an improvement in car-fenders; and it consists in certain novel constructions and combinations of parts hereinafter described and claimed.

In the drawings forming a part hereof, Figure 1 is a side elevation of my improvement attached to a car-body, showing the fender in its normal position in full lines and in its elevated and depressed positions in dotted lines. Fig. 2 is a bottom plan view. Fig. 3 is a section on the line 3 3 of Fig. 1, and Fig. 4 is a detail section on the line 4 4 of Fig. 2.

In the present application of my invention I provide a fender A, comprising a frame composed of a rod $a$, bent into a substantially rectangular form, the rod on one of the sides of the rectangle being bent outwardly to form a crank-arm $a'$ and the rod on the opposite side being provided with a sleeve $a^2$ for a purpose to be hereinafter described. A cross-bar $a^3$ connects the ends of the frame adjacent to the side provided with the sleeve, and a netting $a^4$ is secured to the said cross-bar and to the ends and the opposite side of the frame, leaving an open space between the said cross-bar and the sleeve.

Brackets B are secured to the ends of the car-body M, the brackets being provided with the bearings $b$, and within the bearings is journaled the side of the frame provided with the crank-arm, the rod being removably held in the bearings by means of the bolts and nuts $b'$. Chains $b^2$ connect the ends of the frame with the posts $m$, supporting the roof of the car, the chains having springs $b^3$ interposed in their length and being attached to said posts by means of the hooks $b^4$, engaging the rings $b^5$ upon the posts. The chains are of a length sufficient to maintain the fender normally in a horizontal position with the free edge thereof elevated a suitable distance above the track. A vertical fender C is rigidly attached to the brackets, and the vertical fender is provided with hooks $c$ for engaging the end members of the frame to maintain the horizontal fender in an elevated position when the same is not in use.

A brake-shaft D, provided with the usual crank-handle $d$ and journaled in bearings $d'$ upon the car-body, is provided with the usual ratchet-wheel $d^2$, engaged by the pawl $d^3$, and upon the lower end of the shaft is a sleeve $d^4$, having integral therewith the pinion $d^5$ for a purpose to be hereinafter described. The brake-shaft is connected, by means of the chains $d^6$, with the brake-rod $d^7$, connected with the brakes in the usual manner.

A bracket $e$, having an angular arm $e'$, is secured to the floor of the car adjacent to the brake-shaft, and the angular arm is provided with an upwardly-projecting stud-shaft $e^2$, encircled by a coil-spring $e^3$. A sleeve $e^4$, provided with a spring-seat $e^5$ for receiving the upper end of the spring, is slidably mounted upon the stud-shaft, the sleeve projecting through the floor of the car and being provided upon its upper end with a foot-plate $e^6$. The pinion on the depressible sleeve is normally supported by the spring at a higher level than the pinion on the brake-shaft and is arranged to mesh therewith when the sleeve is depressed to its lowest extent. A chain $e^7$, connected to the sleeve by means of a screw $e^8$, extends forwardly to the crank-arm on the fender, being attached thereto by means of a hook $e^9$, engaging an eye $e^{10}$ upon the plate $e^{11}$, secured to said crank-arm. Rods $e^{12}$ of relatively small diameter connect the plate $e^{11}$ with the cross-bar $a^3$, to which the outer edge of the netting is secured.

It will be evident from the description that when the sleeve is depressed by means of the foot-plate and the pinion thrown into mesh with the brake-shaft the rotation of the brake-shaft will be imparted to the depressible sleeve, thus winding the chain upon the said sleeve, drawing the crank-arm to the rear, and depressing the edge of the fender into contact with the track. The provision of the sleeve on the free edge of the fender reduces friction and permits the said edge to ride over small obstructions without injury to the fender, and the arrangement of the outer edge of the netting at a slight distance from the edge of the fender prevents injury to the netting when the fender is depressed into contact with the track.

In practical operation should the motorman discover that he is unable to stop his car in time to prevent striking an object upon the track it is only necessary for him to depress the sleeve by means of the foot-plate, throwing the sleeve into gear with the brake-rod, when a quarter-turn of the rod will depress the free edge of the fender into contact with the track. Should the object be thrown into the fender, the releasing of the sleeve allows the same to rotate freely, releasing the fender, when the springs will immediately raise it into horizontal position, thus removing the object entirely from the track. The vertical fender prevents injury to such object by striking the front of the car or the draw-bar. When the fender is not in use, it may be hooked up to the vertical fender or be removed from the car by removing the bolts $d'$ or transferred to the opposite end of the same.

It will be evident from the description that my improved fender, although simple in construction, is very efficient in operation. A simple pressure of the motorman's foot is all that is necessary to throw the brake-shaft into gear with the means for depressing the fender, and a quarter-turn of the brake-shaft will lower the front of the fender into contact with the track, and it may be maintained in firm contact with the track, so that nothing can pass under it until released from the brake-shaft. When it is lowered with the car moving at full speed, it will strike a person standing on the track at the bottom of his feet and by forcing them outwardly will cause such person to fall back into the netting.

My improved fender may be constructed at slight expense, it being possible to utilize the greater part of the fender at present in use in the construction of the same.

It will be evident that instead of securing the vertical fender upon the brackets it might be secured directly to the horizontal fender, in which case the springs would be engaged with the vertical part of the fender.

Having thus described my invention, what I claim as new, and desire to secure by Letters Patent, is—

1. In apparatus of the class described, the combination of the car, brackets secured to the front end thereof, an upright fender secured to the brackets, a horizontal fender comprising a substantially rectangular frame, composed of side and end members and provided with elastic netting and journaled in the brackets by one of its side members, a rotatable sleeve on the opposite side member, coil-springs connecting the end members to the car-body and normally retaining the fender in a horizontal position, a crank-arm arranged centrally on the rear side member of the fender, a brake-shaft journaled on the car and provided with a sleeve on the lower end thereof, a pinion on the sleeve, a bracket depending from the car-body adjacent to the pinion, a stud-shaft projecting upwardly from the bracket, a coil-spring encircling the stud-shaft, a depressible sleeve slidably mounted on the stud-shaft, and provided with a seat for engaging the spring, a pinion on the sleeve normally out of mesh with the pinion on the brake-shaft, a foot-plate on the upper end of the sleeve whereby to depress the same to throw the pinion into mesh with the pinion on the brake-shaft, and flexible connections between the depressible sleeve and the crank-arm of the fender.

2. In apparatus of the class described, the combination with a car-body of a fender journaled on the front end thereof and provided with a depending arm adjacent to the car-body, springs for normally retaining the fender in a horizontal position, a brake-shaft journaled on the car-body, a sleeve secured to the lower end of the brake-shaft, a pinion on the sleeve, a bracket adjacent to the brake-shaft and provided with an upwardly-projecting stud-shaft, a sleeve slidably mounted on the stud-shaft, means for normally retaining the sleeve in elevated position, a pinion on the sleeve, means for depressing the sleeve to throw the pinion in mesh with the pinion on the brake-shaft, and a connection between the sleeve and the depending arm of the fender whereby the rotation of the sleeve will depress the free edge of the fender into contact with the track.

3. In apparatus of the class described, the combination with a car-body, of a fender journaled on the end thereof, means for normally retaining the fender in a horizontal position, a brake-shaft journaled on the car-body, a sleeve secured to the lower end of the brake-shaft, a pinion on the sleeve, a stud-shaft mounted adjacent to the brake-shaft, a depressible sleeve slidably mounted on the stud-shaft, means for normally maintaining the sleeve in an elevated position, a pinion on the sleeve, means for depressing the sleeve whereby to throw the pinion in mesh with the pinion on the brake-shaft, and means whereby the rotation of the sleeve may depress the free edge of the fender.

4. In apparatus of the class described, the combination with the car-body, of a fender journaled on the end thereof, means for normally retaining the fender in a horizontal position, a brake-shaft journaled on the car-body, a stud-shaft mounted adjacent to the brake-shaft, a depressible sleeve mounted upon the stud-shaft and normally retained in elevated position, means whereby the brake-shaft may impart rotation to the sleeve when the same is in its depressed position, and connections between the sleeve and the fender whereby rotation of the sleeve may depress the free edge of the fender.

5. In apparatus of the class described, the combination with the car-body, of a fender journaled on the end thereof, means for normally retaining the fender in horizontal position, a brake-shaft journaled on the car-body, a depressible sleeve mounted adjacent to the brake-shaft, means for normally retaining the sleeve in elevated position, means whereby the brake-shaft may impart rotation to the sleeve when the sleeve is depressed, and means whereby the rotation of the sleeve may depress the free edge of the fender.

6. In apparatus of the class described, the combination with the car-body, of a fender hinged to the end thereof, means for normally retaining the fender in horizontal position, a brake-shaft journaled on the car-body, means normally disconnected from the brake-shaft for depressing the free end of the fender into contact with the track, and means whereby to connect said depressing means with the brake-shaft.

7. In apparatus of the class described the combination with the car-body, of a fender hinged to the end thereof, means for normally retaining the fender in horizontal position, a brake-shaft journaled on the car-body, means normally disconnected from the brake-shaft for depressing the free edge of the fender into contact with the track, and means whereby the brake-shaft may operate said depressing means.

8. In an apparatus of the class described, the combination with the car-body, of a spring-supported fender hinged thereto, a brake-shaft journaled on the car-body, means normally disconnected from the brake-shaft for depressing the free end of the fender, and means whereby the brake-shaft may operate said depressing means.

9. In apparatus of the class described, the combination with the car-body, of a spring-supported fender hinged thereto, a rotatable brake-shaft journaled on the car-body, means for depressing the free edge of the fender, and means for connecting said depressing means and said brake-shaft whereby rotation of the latter will actuate the former.

10. In apparatus of the class described, the combination with the car-body of a spring-supported fender hinged thereto, a rotatable brake-shaft journaled on the car-body, rotatable means normally disconnected from the brake-shaft for depressing the free edge of the fender, and means for connecting the brake-shaft and said depressing means.

11. In apparatus of the class described, the combination with a car-body having a brake-shaft, of brackets secured to the end thereof, a vertical fender secured to the brackets, a horizontal fender comprising a substantially rectangular frame journaled in the brackets, a rotatable sleeve on the free edge of the fender, an elastic connection between the fender and the car-body for maintaining the fender in a horizontal position, means for depressing the free edge of the fender, and means whereby the brake-shaft may actuate said depressing means.

12. In an apparatus of the class described, the combination with the car-body having a brake-shaft, of a normally horizontal fender hinged to the car-body, means normally disconnected from the brake-shaft for depressing the fender and maintaining the same in contact with the track, and means whereby the brake-shaft may operate said depressing means.

JOACHIM C. JORGENSEN.

Witnesses:
SOLON C. KEMON,
J. C. DONALDSON.